P. MELNICK.
WINDMILL.
APPLICATION FILED JULY 2, 1921.

1,418,194.

Patented May 30, 1922.
3 SHEETS—SHEET 1.

Polikarp Melnick
INVENTOR

BY Victor J. Evans
ATTORNEY

Alfred F. Bratton
WITNESS:

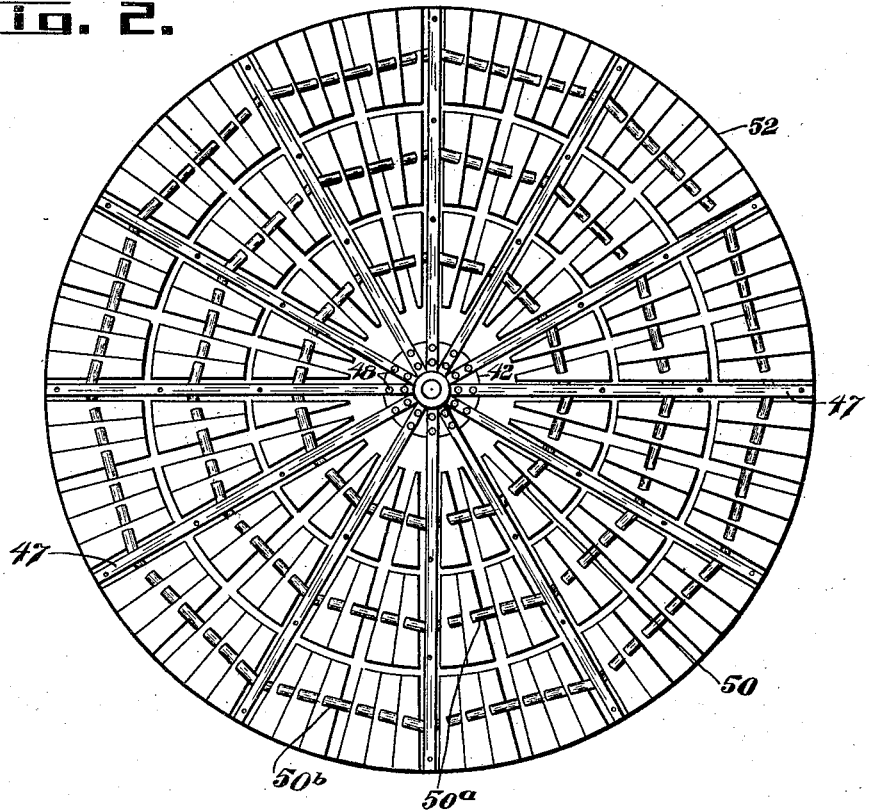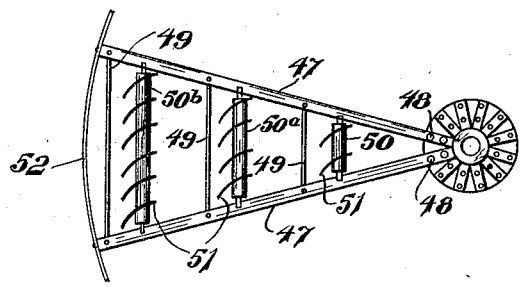

P. MELNICK.
WINDMILL.
APPLICATION FILED JULY 2, 1921.

1,418,194.

Patented May 30, 1922.
3 SHEETS—SHEET 3.

Polikarp Melnick
INVENTOR

BY Victor J. Evans
ATTORNEY

Alfred T. Bratton
WITNESS:

UNITED STATES PATENT OFFICE.

POLIKARP MELNICK, OF CAMDEN, NEW JERSEY.

WINDMILL.

1,418,194. Specification of Letters Patent. Patented May 30, 1922.

Application filed July 2, 1921. Serial No. 482,156.

*To all whom it may concern:*

Be it known that I, POLIKARP MELNICK, a citizen of Russia, residing at Camden, in the county of Camden and State of New Jersey, have invented new and useful Improvements in a Windmill, of which the following is a specification.

This invention relates to windmills and it has more particular reference to windmills of the type in which the vanes of the wind wheel are adapted for adjustment to accommodate varying wind velocities whereby the power produced and the work effected are maintained at a practically constant amount.

The primary object of this invention is to provide a windmill wherein the vanes of the wind wheel are all pivotally mounted and are adapted to be synchronously turned or feathered from inactive position to their maximum active position, and vice versa, said movement being effected through the wind wheel shaft.

Another object of this invention is the provision of a novel power take-off mechanism which is positively actuated no matter what direction the wind takes nor how frequently it veers or changes.

A further object of my invention is to provide a windmill of light construction but great strength whereby it can withstand abnormal wind and storm conditions and in as far as its power production is concerned remain unimpaired.

A still further object of this invention is to provide a windmill in which all the operating parts are so constructed and arranged that there will be a minimum degree of frictional retardation.

A yet further object aimed at by this invention is to provide a windmill characterized by a novel means of adjustment for rendering the power output normally stable when once it is set in active operation.

With the foregoing and other objects in view as will become more clearly apparent from the following description my invention resides essentially in the novel features of construction, combinations and arrangements of parts hereinafter particularly described and more specifically defined by the appended claims.

In the further disclosure of the invention reference is to be had to the accompanying sheets of explanatory drawings constituting a part of this specification, and in which like characters of reference designate the same or corresponding parts in all the views.

Figure 1:
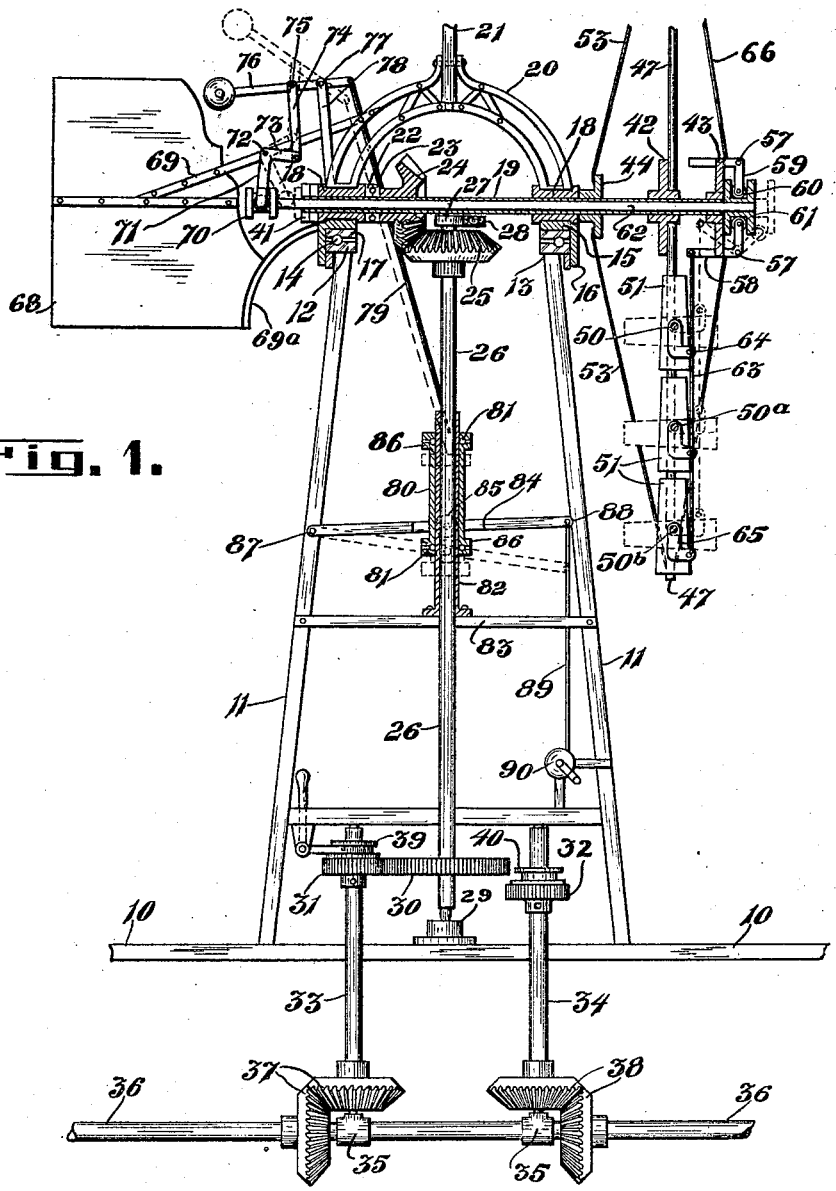

Figure 1— is an elevation of my improved windmill with parts broken away and in section for a clearer understanding thereof.

Figure 2— is an enlarged face view of the wind-wheel detached and showing the vanes in active position.

Figure 3— is a detail view of one of the wind-wheel unit sections with the vanes feathered or in full inactive position.

Figure 4:
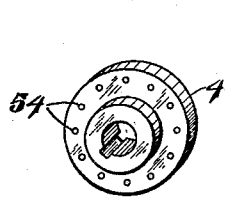

Figure 4— is an enlarged detail perspective view of the rear hub of the wind-wheel.

Figure 5:
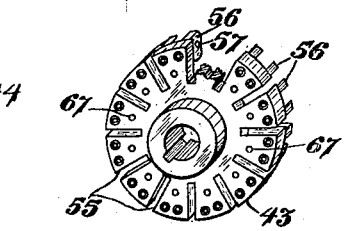

Figure 5— is a similar enlarged perspective view of the front hub of said windwheel.

Figure 6:
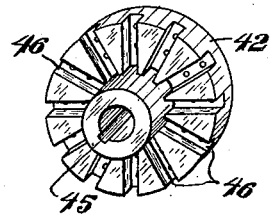

Figure 6— is an enlarged perspective view of the center hub of the wind-wheel or that part thereof which supports the main framework in which the vanes are mounted.

Figure 7:
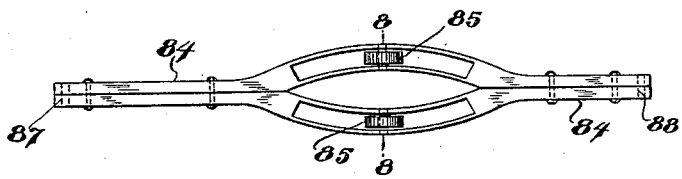

Figure 7— is a detail plan of an adjusting lever hereinafter more particularly referred to.

Figure 8:
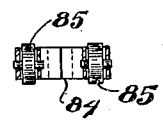

Figure 8— is a section on the line 8—8 in the preceding Figure.

Figure 9:
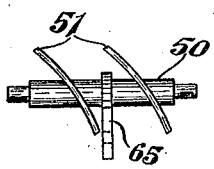
Figure 10:
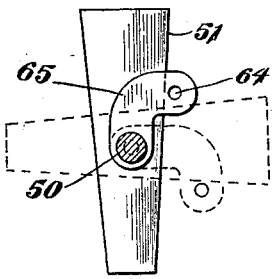

Figure 9— is a detail plan of one of the vane sections and showing its actuating lever; and, Figure 10— is a side view of the same with with vanes shown in the active position by full dotted lines, and in inactive position by dotted lines.

Referring more particularly to the views the numeral 10 designates a platform or foundation on which the superstructure or tower is firmly erected, said tower including a plurality or series of upwardly converging columns 11 of appropriate crosssection to ensure rigidity, and these columns 11 have securely fixed on their upper ends an annular ring or track 12 provided on its upper face with a groove or race 13 for an anti-friction bearing 14 of appropriate nature. Arranged for rotary movement in a horizontal plane on the aforesaid anti-friction bearing 14 is the turntable or main supporting frame 15 which is provided with a depending rim 16 to prevent ingress of dirt and the like to the bearing 14, as well as to prevent any lateral displacement of said turntable relative to the track 12. It may be here conveniently noted that the turntable 15 is of angular cross section, the depending flange 16 whereof serves for centering and bearing protection purposes as above set forth, whereas the lateral flange is fitted on its underside with a bearing ring 17 of suitable material and strength to withstand the ravages of time and weather.

At diametrically opposed points on the upper side of the turntable or main frame 15 I form or fix bearings 18 which constitute journals for a horizontally disposed tubular shaft 19 later on more particularly referred to, and also supported by said turntable or main frame 15 is a skeleton canopy or crown structure 20 supporting a staff 21 on which may be mounted a weather vane or a flag as desired.

Adjacent or abutting one of the aforesaid bearings 18 and secured thereto is one half 22 of an anti-friction collar bearing the other half 23 whereof is keyed on the tubular shaft 19 and connected to a miter gear 24 meshing with a corresponding gear 25, at the upper end of a vertical shaft 26 revolvably journaled at its top in a bearing block 27 carried by a transverse beam 28 braced to the aforesaid columns 11 in any of the well known ways. This vertical shaft 26 is supported at its lower end in an anti-friction foot bearing 29 and it has securely keyed or otherwise mounted thereon a laterally rotatable toothed-wheel 30 with which may be put in mesh either of opposed pinions 31, 32, respectively, carried by spaced vertical shafts 33, 34, supported at their lower ends on journal bearings 35 in turn revolvably supporting the power take-off shaft 36. Opposed miter gears 37, 38 respectively, connect up the vertical shafts 33, 34 to the power take-off shaft 36 and it is to be noted that the pinions 31, 32 are controlled by manually movable clutches 39, 40, whereby either or both of said pinions may be disconnected from the aforesaid toothed wheel 30 whenever desired; whilst it will be clearly understood that when one of said pinions 31, 32 is in gear with the toothed wheel 30 the power take-off shaft 36 will be driven in one direction whereas when the other pinion is in gear the rotation of said shaft 36 will be reversed.

The aforesaid tubular shaft 19 supports at one end the wind-wheel and it is provided at its other end with locking collars 41 whereby said wind-wheel may be accurately adjusted to prevent end-thrust and friction against the abutting bearing 18 as will be obvious to those acquainted with the art to which this invention appertains.

The wind-wheel proper includes an inner hub portion or frame support 42, and front and rear spaced hubs or bracing collars 43, 44 respectively, said inner hub or frame support 42—as shown more clearly by Figure 6—being provided with a key-way 45 by means of which it can be securely fixed on the tubular shaft 19 and a series of radially disposed grooves 46 in which are firmly fitted the arms or spokes 47 of the wind-wheel bolts or the like 48 serving to attach said parts rigidly together. These arms or spokes 47 are made of appropriate material and each adjoining pair are braced by light tie rods 49—Figure 3—as well as serving as supports for tangentially disposed and freely pivoted spaced rollers 50, 50$^a$ and 50$^b$. The rollers 50$^a$, 50 and 50$^b$ carry the wings or vanes 51 which are preferably made of strong sheet material of even gauge and curved cross section as shown by Figures 3 and 9, said rollers respectively carrying two, four and six wings or vanes 51 arranged to break joint so that a maximum wind surface is presented when the vanes are in active position, and no interfering air pockets can be created. Completely surrounding the wind wheel and firmly secured to the aforesaid arms or spokes 47 is an annular band or rim 52 whilst rear tie-rods or braces 53 connect with the rear hub or bracing collar 44 and riveted or otherwise connected into the holes 54 therein, said hub or bracing collar 44 being securely attached to the hollow or tubular shaft 19 in any of the well known ways. The front hub or bracing collar 43 is preferably of the form shown most clearly by Figure 5, that is to say, it is provided with a series of radially disposed grooves 55 adjoining which and on the outer side of the flanged portion whereof are formed or fixed opposed eye bearings or laterally projecting lugs 56 between which are pivoted at 57 angled levers the longer arms 58 whereof are horizontally directed inwards whereas the shorter arms 59 are vertical and provided at their free ends with anti-friction rollers 60 that co-operate with a channeled collar 61 securely fixed to the outer end of a solid shaft 62 longitudinally movable within the hereinbefore mentioned tubular shaft 19 and for the purpose later on explained. The inner ends of the longer arms 58 are pivotally connected to radial feathering rods 63 having operative connection at 64 to elbow members 65 securely mounted centrally of each of the aforesaid spaced rollers 50, 50$^a$ and 50$^b$, and it will be clearly understood that as the said radial feathering rods 63 are inwardly or outwardly drawn they will effect a partial rotation of said rollers 50, 50$^a$ and 50$^b$ with a consequential opening or closing of the wings or vanes 51 as can be readily seen on an examination of Figure 1 more particularly. Front tie-rods or bracings 66 connect from the forward outer ends of the aforesaid arms or spokes 47 into holes 67 in the front hub 43 where they are appropriately secured in any of the well known ways and whereby the wind-wheel is effectively braced in all directions to effectively withstand high winds as well as storm conditions whilst in active use or when inoperative.

A mill vane 68 is appropriately braced to and supported by the aforesaid canopy 20 and turntable or main frame 15 by braces 69, 69ª, and its function will be obvious without further reference thereto.

Securely cottered or otherwise fixed on the solid shaft 62 remote from the wind-wheel is a grooved collar 70 with which engages the yoked arm 71 of a cranked or angle lever fulcrumed at 72 on the brace 69, the other arm 73 of said cranked lever being pivotally connected to one end of a link 74, in turn connecting at 75 with a weighted lever 76 rockingly mounted at 77 on an upright or bearing 78 carried by the aforesaid turntable or main frame 15. This weighted lever has pivoted thereto the upper end of a connecting rod or rods 79, the lower end or ends whereof have similar connection with a sleeve or collar 80 provided with ball bearings 81 and adapted for vertical movement of an inner tubular bearing 82 supported by a cross frame 83, and in which the aforesaid vertical shaft 26 freely rotates. Adapted to straddle the sleeve or collar 80 is a yoke or apertured member 84—Figures 7 and 8—having inset anti-friction rollers 85 for engagement with the upper and lower flanges 86 of the aforesaid slidable sleeve 80, and said yoke or apertured member 84 is hingedly connected at one end 87 to one of the columns 11 whilst the other end 88 has attached thereto a flexible cable or chain 89 arranged to be wound onto or from a winding drum 90 fitted with any suitable locking or arresting means—not shown. Thus it will be readily seen that when a downward pull is exerted on the cable or chain 89 by turning the drum 90 in a clockwise direction, the yokes or apertured member 84 will cause the sleeve or collar 80 to be drawn in a downward direction thereby exerting a pull on the rod or rods 79 which will rock the weighted lever 76 on its pivot 77 in an upward direction as shown by the dotted lines in Figure 1. Simultaneously there will be an upward pull on the link 74 which will rock the cranked or angle lever 71—73 on its pivot 72 and thereby forcing the solid shaft 62 axially forward or outwards relative the front of the wind-wheel. This sliding movement of the solid shaft 62 towards the right-hand of Figure 1 results in a rocking of the angle levers 58, 59, through the channeled collar 61 as shown by the dotted line position at the right hand of said figure, whereupon the longer arms 58 of said angle levers will exert an inward radial pull on all of the feathering rods 63. These feathering rods 63 will in turn through the elbow members 65 rock all the rollers 50, 50ª and 50ᵇ partially and synchronously about their axis whereby the wings or vanes 51 will be feathered or deflected to the requisite extent. This uniform and synchronizing movement of the wings or vanes 51 I deem of primary importance as by its simple construction and positive action I am enabled to accurately adjust the power producable by my improved windmill. Obviously on releasing the pull on the flexible cable or chain 89 the solid shaft 62 will be drawn in a reverse direction or towards the left-hand of Figure 1 by the action of the weighted lever 76.

From the foregoing description and a careful examination of the drawings it will be easily seen that by my invention I provide an extremely simple and efficient windmill or power generator which when once adjusted may be safely allowed to continue working without any appreciable attention for lengthy periods of time, and the numerous uses to which it can be applied in practice are too numerous for enumeration here beyond stating that an installation on the lines hereinbefore described can be very appropriately erected on the deck of a river houseboat or light aircraft as by attaching a screw propeller to the power take-off shaft 36 it will be obvious said craft can be easily propelled. On the other hand a windmill or power generator of the type disclosed may be coupled up or connected to a dynamo electric generator, various forms of machinery, presses, pumps and other power actuable mechanisms without in any way departing from its essential features or method of operation.

Whilst I have shown and described the best form of the invention at present known to me I wish it clearly understood that the same is not to be construed restrictedly as it will be obvious that many changes in the several details, and other combinations and arrangements of the several parts can be readily effected without departing from its true essentials, and it is hereby intended to include all such reasonable changes and other forms thereof as fairly lie within the scope of the appended claims.

Having described my invention, what I claim as new and desire to secure by Letters Patent is:

1. In a wind actuated power producing mechanism the combination of a supporting framework surmounted by an annular track, a turntable rotatable on said track by means of a mill vane, a horizontal tubular shaft rotatable in bearings on said turntable, an inner shaft longitudinally movable in said tubular shaft, a wind-wheel attached on the outer end of said hollow shaft and including a series of interconnecting tangentially pivoted wings of concavo-convex cross section, said wind-wheel comprising an inner and outer spaced hubs, the inner hub including a series of radial arms between which the aforesaid wings are journaled, means for bracing said arms together and to the aforesaid spaced hubs, angled levers pivoted about the perimeter of the outermost hub and having all their arms on one side of their pivotal points operatively connected to elbow members on the axes of the wing planes, a collar on the inner shaft in operative engagement with the other arms of said angled levers whereby they are simultaneously rocked to effect the angular deflection or opening outwards of said wing vanes, means for automatically closing said wing vanes, and manually operable means for effecting the outward movement of the aforesaid inner shaft.

2. In a wind actuated power producing mechanism the combination of a supporting frame work surmounted by an annular track, a turntable rotatable on said track by means of a mill vane, a horizontal tubular shaft rotatable in bearings on said turntable, an inner shaft longitudinally movable in said tubular shaft, a wind-wheel attached on the outer end of said hollow shaft and including a series of interconnecting tangentially pivoted wings of concavo-convex cross section, said wind-wheel comprising an inner and outer spaced hubs, the inner hub including a series of radial arms between which the aforesaid wings are journaled, means for bracing said arms together and to the aforesaid spaced hubs, angled levers pivoted about the perimeter of the outermost hub and having all their arms on one side of their pivotal points operatively connected to elbow members on the axes of the wing-planes, a collar on the inner shaft in operative engagement with the other arms of said angled levers whereby they are simultaneously rocked to effect the angular deflection or opening outwards of said wing vanes, a collar on the inner end of the longitudinally movable shaft, a weighted lever fulcrumed on the turntable and having operative connection with said collar by means of a link and angled yoke, and manually operable means for raising the aforesaid weighted lever to effect the longitudinal outward movement of the inner shaft to deflect the concavo-convex wings.

3. In a wind actuated power producing mechanism the combination of a supporting framework surmounted by an annular track, a turntable rotatable on said track by means of a mill vane, a horizontal tubular shaft rotatable in bearings on said turntable, an inner shaft longitudinally movable in said tubular shaft, a wind-wheel attached on the outer end of said hollow shaft and including a series of interconnecting tangentially pivoted wings of concavo-convex cross section, said wind-wheel comprising an inner and outer spaced hubs, the inner hub including a series of radial arms between which the aforesaid wings are journaled, means for bracing said arms together and to the aforesaid spaced hubs, angled levers pivoted about the perimeter of the outermost hub and having all their arms on one side of their pivotal points operatively connected to elbow members on the axes of the wing-planes, a collar on the inner shaft in operative engagement with the other arms of said angled levers whereby they are simultaneously rocked to effect the angular deflection or opening outwards of said wing vanes, a collar on the inner end of the longitudinally movable shaft, a weighted lever fulcrumed on the turntable and having operative connection with said collar by means of a link and angled yoke, a shaft rotatable by the aforesaid tubular wind-wheel shaft, a sleeve longitudinally movable on the first mentioned shaft, means connecting said sleeve with the aforementioned weighted lever, a pivoted yoke member having an anti-friction connection with the sleeve, and means for oscillating said yoke whereby the weighted lever is raised to effect the longitudinal movement of the inner shaft and thereby deflect the concavo-convex wings simultaneously in the wind-wheel.

4. In a windmill including a supporting framework surmounted by an annular track, a turntable rotatable on said track by means of a mill vane, a horizontal tubular shaft rotatable in bearings on said turntable, a wind-wheel attached to the outer end of said hollow shaft and including a series of interconnecting tangentially-pivoted wings of concavo-convex cross section, means for effecting the angular deflection of said wings, and gravity fall means for returning said wings to normal position, the combination of a power take-off mechanism including a shaft driven from the aforesaid tubular shaft and having a gear thereon, diametrically opposed auxiliary shafts each of which may be driven by the aforesaid gear when coupled thereto, and a power-shaft rotatable by either of said auxiliary shafts whereby provision is made for reversing the direction of drive.

5. In a windmill including a supporting framework surmounted by an annular track, a turntable rotatable on said track by means of a mill vane, a horizontal tubular shaft rotatable in bearings on said turntable, a wind-wheel attached to the outer end of said hollow shaft and including a series of interconnecting tangentially pivoted wings of concavo-convex cross section, means for effecting the angular deflection of said wing vanes, and gravity fall means for returning said wings to normal position, the combination of a power take-off shaft including a vertical shaft driven from the aforesaid tubular shaft and having a gear thereon, diametrically opposed auxiliary vertical shafts either of which may be driven by the aforesaid gear when coupled thereto, a power shaft rotatable by either of said auxiliary shafts, and clutch mechanism for coupling up or disconnecting each of said auxiliary shafts whereby the direction of power drive may be reversed.

In testimony whereof I affix my signature.

POLIKARP MELNICK.